Dec. 29, 1936.  M. BÄUML  2,065,960
MEASURING APPLIANCE
Filed Sept. 17, 1934  4 Sheets-Sheet 1

Dec. 29, 1936.  M. BÄUML  2,065,960

MEASURING APPLIANCE

Filed Sept. 17, 1934    4 Sheets-Sheet 2

Inventor
Maximilian Bäuml,
By Frank S. Appleman,
Attorney

Dec. 29, 1936.   M. BÄUML   2,065,960
MEASURING APPLIANCE
Filed Sept. 17, 1934   4 Sheets-Sheet 3

Inventor,
Maximilian Bäuml,
Franz S. Appleman,
attorney

Dec. 29, 1936. M. BÄUML 2,065,960
MEASURING APPLIANCE
Filed Sept. 17, 1934 4 Sheets-Sheet 4

Inventor,
Maximilian Bäuml,
G Frank A Ackerman,
Attorney,

Patented Dec. 29, 1936

2,065,960

UNITED STATES PATENT OFFICE 2,065,960

MEASURING APPLIANCE

Maximilian Bäuml, Vienna, Austria, assignor of one-half to Johannes Bäuml, Vienna, Austria Application September 17, 1934, Serial No. 744,454
In Austria October 3, 1933

37 Claims. (Cl. 265—5)

This invention relates to a device for use in connection with measuring appliances, and more particularly automatic weighing machines, for the indication of the measurement figures or for the operation of registering, indicating, or counting mechanism, and has for its object to enable the figures of measurement to be read off directly in numbers without the necessity for looking at a graduated scale and pointer, and also to permit of the transference of the numbers representing the results of measurement to a further set of apparatus.

In accomplishing these objects the invention makes use of known expedients to the extent of using a screen which is moved in accordance with the measuring action or process, which screen is adapted to be illuminated from one side, and is provided with transparent apertures corresponding to the subdivisions of the range of measurement, and so arranged that the manner in which light passes therethrough in the measuring position can be used for influencing or effecting the indication or registration.

In a known device of this nature there are provided upon a drum groups of parallel slots the lengths of which are graduated in accordance with the divisions of the scale of the appliance, so that a photoelectric cell passed transversely across the slots when the mechanism is in the measuring position receives, according to the number of slots traversed in each group, a varying number of current impulses which can then be utilized for influencing registering apparatus. With this known device, however, the dependence of the action upon the imparting and receiving of a certain number of current impulses in each instance implies a certain degree of uncertainty, makes it necessary for the influencing of the registering means to be effected intermittently, and consequently with undue loss of time, and therefore also imposes limitations on the choice of the method used to effect the transference to the secondary apparatus. A further element of uncertainty inherent in this type of device resides in the fact that the action of both a period of light and also a period of darkness is required to bring about the registration of each digit. But the most serious drawback of all is that the direct reading off in figures of the results of measurement would appear to be impossible with this prior device.

The present invention consists essentially in the arrangement upon the screen in staggered relation to each other, and graduated according to the subdivision of the range of measurement, of transparent or non-transparent areas the extent of which, when measured in the direction of movement of the screen, corresponds in each case to that of the appropriate interval of the subdivision, so that when light is passed through the screen the number to be indicated can be read off directly at a fixed screened slot, or the transmission of this number to a registering, indicating, or counting apparatus can be initiated by a single current fluctuation in an optico-electrical manner. According to the invention the transparent or non-transparent areas on the screen are divided up into groups according to digit denominations, a unit of each group being arranged to extend over the range of the subdivision of the same in the next lower digit denomination, so that one transparent or non-transparent area comes into operation for each digit denomination. If the result of measurement is to be transmitted a photoelectic unit adapted to be guided along the slot, in one of the possible forms of construction, is positively connected, directly or by means of intermediate links, with the registering, indicating, or counting apparatus. As soon as the photoelectric cell reaches the portion of the slot affected by the light, the current fluctuation occurring in the cell interrupts this positive connection, with the result that driven parts of the registering apparatus remain in the position reached which corresponds to the measurement taken, or steps are initiated for effecting remote indication. The invention thus permits of the setting of the indicating or registering device to the number to be reproduced in a single operation, and with the utilization of but one single phase of actuation by light. The complete device provided by the present invention is thus very considerably simpler in construction and more reliable in action than the hitherto known device of a similar nature referred to above. The term "photoelectric cell" as employed hereinafter is to be taken to include any unit or body capable of responding to rays of any kind by initiating electric actuation or varying its electric resistance.

Forms of construction embodying the invention are shown, by way of example in conjunction with a weighing machine, in the accompanying drawings, in which.

The platform 70 (Fig. 1) on which the load is placed is supported in a known manner on a system of levers of which an arm 71 is connected by a knife-edge link 72 to the rocker 73. 74 denotes a conventional fluid brake. To the rocker 73 there is attached a steel ribbon 75 which is attached at the other end to the curved surface of a sector 76 supported in bearings 77 pertaining to the casing 11 of the weighing machine. To the axle of the sector 76 there is attached a screen 12 of cylindrical shape, provided with series of transparent areas which are arranged in graduated staggered relation to each other, according to the different digit values. The windows for the units are denoted in the drawings by their appropriate numerals 0, 1, 2, 3, 4 ... 9, and are arranged in oblique rows by decades. Each such row (decade of digits) has opposite to it in the next higher digit denomination (the tens) a transparent window 0, I, II, III ... IX. Each of the windows for the tens, when measured in the direction of movement of the screen as indicatd by the arrow A, is of a length to correspond to the total length of one group of windows in the units. The same applies in the case of the transparent areas or windows for the subsequent digit denominations.

Figure 1:
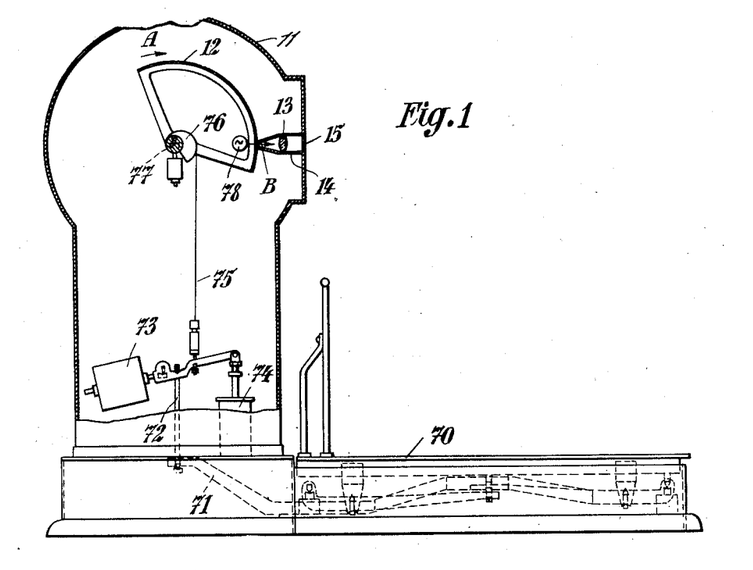
Fig. 1 shows in transverse section a weighing machine in accordance with the invention in which the measurement figures can be read off directly.

Within the screen 12 there is provided a light source 78 which throws a fan of rays in the direction of the arrow B over the transparent areas of the screen, and through a diagrammatically indicated optical system 13 and an enclosed channel 14 inserted in a slot in the casing 11. The arrangement is such that a ground glass screen 15 on which the numerals "0" to "9" are inscribed or a perforated stencil furnished with the numerals "0" ... "9" and inserted in the slot in the casing 11 is just so wide that an image of one transparent area in the units range can be thrown thereon. The length of the screened slot depends on the number of the digit denominations comprised in the range of measurement.

Figure 2:
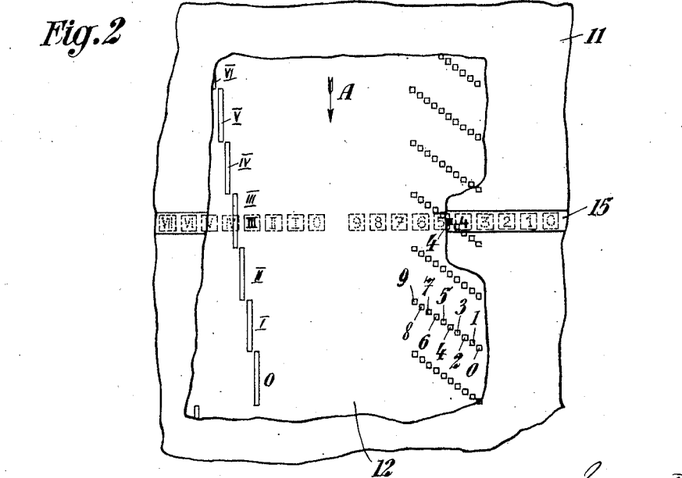
Fig. 2 shows in plan view, on an enlarged scale, a portion of the pivoted screen and the portion of the weighing machine essential for the direct reading off of the measurement figures.

On the loading of the weighing machine the screen revolves together with the axle of the machine into the position of measurement in which, in the example shown (Fig. 2), the transparent areas corresponding to the numeral "4" in the units and the numeral "III" in the tens are disposed opposite the screened slot. The image of the window for the numeral "4" in the unit series is thrown upon the ground glass screen 15 and is magnified by the optical system 13, so that the numeral "4" provided at this point on the ground glass screen becomes clearly visible by being illuminated. Fig. 2 indicates how the numerals are arranged in a row upon the ground glass screen, the size of the images of the appropriate windows in the screen being indicated in broken lines. The unit numeral "4" illuminated in the present instance is shown in full lines. The corresponding designations for the numerals of the tens are likewise provided on the ground glass screen (in the present instance roman figures have been used for the sake of distinction). Of the light passing through the window "III" in the screen the portion received by the optical device is thrown upon the ground glass screen thereby (in the example shown) illuminating thereon the numeral "III" which is accordingly shown in full lines in Fig. 2. Thus if the higher digit denominations, which are not visible in the example shown, be ignored, the device gives an indication of the number "34" which, as can be seen can be directly read off on the ground glass screen. If the measuring position should come in between any two digits the two adjacent numerals concerned will become partially illuminated so that the correct reading can be made without difficulty.

Figure 3:
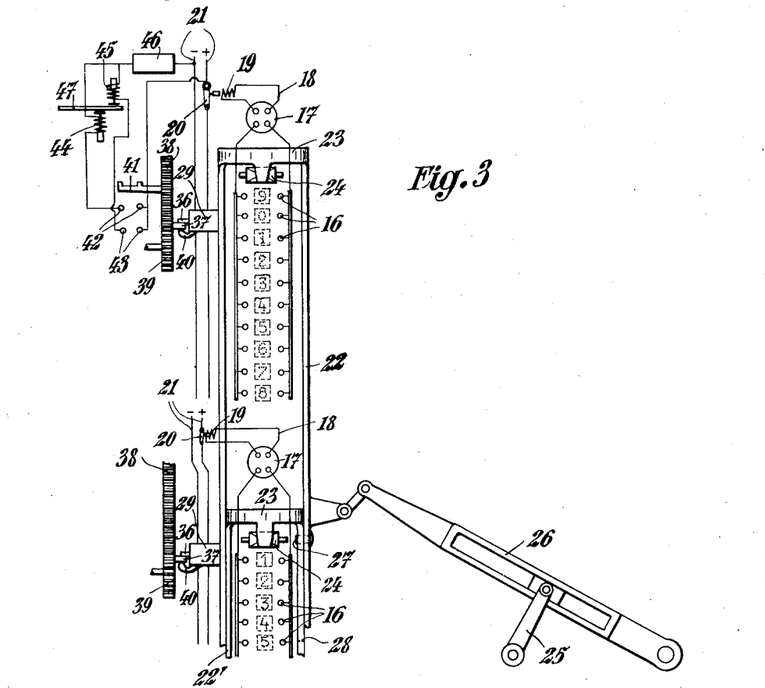
Fig. 3 shows diagrammatically and in plan view an arrangement for the actuation of a registering, indicating, or counting device, in conjunction with a photoelectric cell.
Figures 4, 4A:
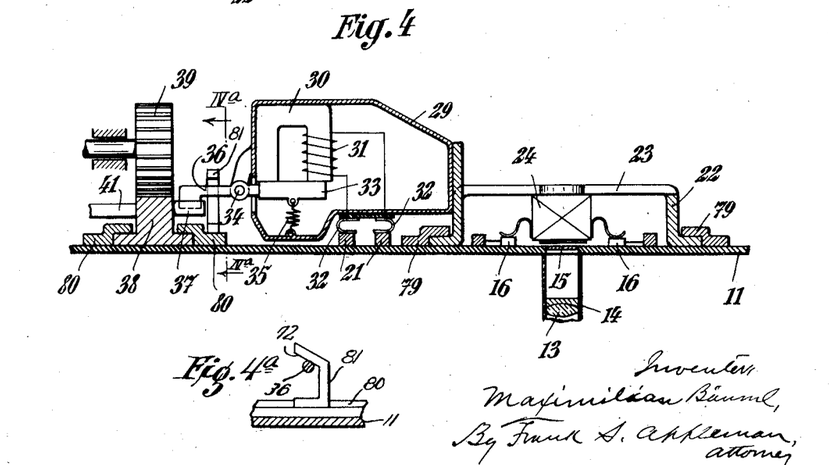
Fig. 4 is a transverse section of the same on an enlarged scale.
Fig. 4a is a section on the line IVa—IVa of Fig. 4.

For the transmission of the figures representing the results of measurement to a registering, indicating, or counting device there are provided, as shown in Figs. 3 and 4, on the casing 11 at both sides of the slot, contacts 16 a pair of which are associated with each of the images of the transparent windows capable of being thrown upon the ground glass screen. Since in this case the recorded figures are not required to be read off directly it is advisable to provide no numerals in connection with the ground glass plate. The numerals shown in Fig. 3 are only given for the purpose of explanation in connection with Fig. 5 of a special arrangement of the transparent areas on the screen which differs somewhat from that shown in Figs. 1 and 2. The contacts disposed in a row and pertaining to one digit denomination are conductively interconnected and connected to an amplifier 17 in the circuit 18 in which there is interposed a relay 19 the switch 20 of which is interposed in a circuit 21. Slidably mounted on the casing 11, to move parallel to the slot in a guide 79 (Fig. 4) there is a frame 22 carrying on a yoke 23 a photoelectric cell 24 which takes the form of a current bridge for the pairs of contacts. For the movement of the frame 22 there is provided a slotted crank arm 26 driven by a crank 25. For the higher digit denominations the arrangement is the same, only for these latter there is provided a single common frame 22' which is coupled to the frame 22 through the interposition of a lost motion device, for which purpose a pin 27 on the frame 22 is guided in a slot 28 in the frame 22'.

To the frame 22 there is attached a casing 29 (Figs. 3 and 4) in which there is arranged a horseshoe magnet 30 on the one limb of which there is provided a winding 31 the ends of which glide by means of sliding contacts 32 along rails connected into the circuit 21. The armature 33 of this magnet is attached to the one arm of a lever pivoted on a pin 34, and is stressed by a tension spring 35. The other lever arm 36 bears with a lug against a pin 37 pertaining to a toothed rack 38 which slides in a guide 80 parallel to the frame 22. Meshing with the rack 38 there is a toothed wheel 39 the shaft of which serves for the transmission of the movement of the frame 22 to the registering, indicating, or counting apparatus. A rigid finger 40 pertaining to the casing 29 bears against the pin 37 in the position shown, opposite the lug on the lever arm 36.

The mode of operation is as follows:—After the weighing machine has come to rest in the measuring position the drive for the crank 25 is switched on, the frame 22 being thereby slid along the slot, and the photoelectric cell passed over the pairs of contacts. As soon as the illuminated spot on the ground glass plate corresponding to the measuring position is reached a current impulse is generated in the photoelectric cell, which impulse is conducted through the appropriate contacts 16, disposed accurately in line with the middle of the illuminated spot, to the amplifier, and thus acts upon the relay 19 the switch 20 of which is thereby so actuated that the circuit 21 is interrupted. The winding 31 on the magnet thereby becomes deprived of current, so that the armature 33 is pulled off under the action of the spring 35, with the result that the lever arm 36 moves out of the path of movement of the pin 37 on the rack 38, and the latter is no longer carried along but is left standing in a position corresponding to the measurement figure. At the same time the action hitherto exerted on the registering, indicating, or counting apparatus driven by the frame 22 is likewise interrupted, and this apparatus sets the printing mechanism to the number representing the result of the measurement. On the return movement of the frame 22 the finger 40 engages against the pin 37, and restores the rack 38 to its initial position. Since the photoelectric cell, on passing through the position of measurement, delivers but one current impulse, the circuit 21 will be reclosed after a short interruption at the switch 20, but the winding 31 is so dimensioned that the normal current flowing therethrough is not sufficient to attract the detached armature, so that the above-described actuation of the rack during the return movement is not affected. The armature is brought into closing position upon the frame 22 being in its initial position and for this purpose there is provided a member 81 (Figs. 4 and 4a) which is fixed on the member 80 and is provided with a cam surface 72 located in the path of the lever arm 36 so that as the arm 36 strikes this cam surface it will be depressed and the armature will be correspondingly raised.

Figures 9, 10:
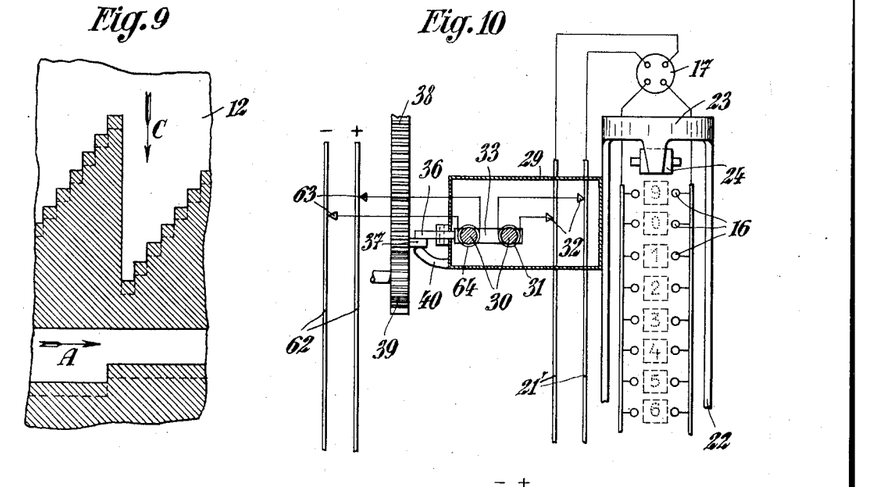
Figs. 10 and 11 show modified forms of construction, to be taken in conjunction with Figs. 3, 4 and 6.

In the form of construction shown in Fig. 10 the relay 19 connected to the amplifier 17 is dispensed with, and in this case the device is freed of the inertia or delay attendant on the use of the relay.

To the amplifier 17 of the form shown in Fig. 10 there are directly connected rails 21' which correspond to the branches of the circuit 21 in Figs. 3 and 4. Upon these rails there are arranged to travel the sliding contacts 32 pertaining to the coil 31 of the magnet 30 of the coupling device. With the rails 21' there are associated rails 62 which are constantly connected to a current source not shown in the drawings, and on which there are arranged to travel sliding contacts 63 pertaining to a coil 64 of the magnet. The coils 31 and 64 are so wound that, when traversed by current, they mutually weaken or cancel their effect. In the case of the arrangement shown in Figs. 3 and 4 the armature 33 of the magnet acts upon the registering, indicating or counting mechanism. A current impulse is set up when the photoelectric cell 24 travels past a light-affected portion of the screened slot and amplified by 17, brings about a weakening or interruption of the current flowing constantly in the coil 64, with the result that the magnet is no longer capable of retaining the armature 33 against the action of the spring 35, and the armature, on becoming detached, interrupts the connection with the registering device, so that the latter is left in the position reached at the moment.

Figure 5:
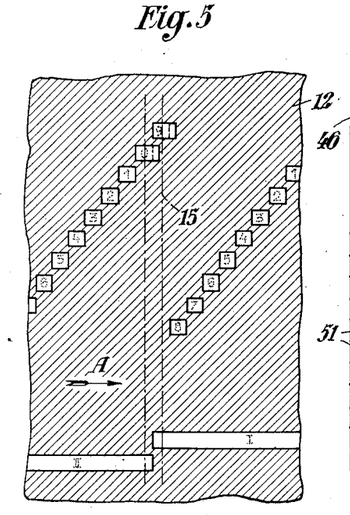
Figs. 5, 7 and 9 show modified forms of the screen.

In order to preclude errors in the high digit denominations which might occur on account of the arrangement of the transparent areas in the described échelon formation the modified arrangement of the transparent areas for the range of the units shown in Fig. 5 is provided. In each group of the units the transparent spot standing for the numeral "9" is disposed as a preceding area stepped forward relatively to the transparent spot standing for the numeral "0" in the next group. In Figs. 3, 4, and 9 the transparent areas are accordingly numbered in the order 9, 0, 1, 2 . . . 7, 8. The result achieved by this arrangement is that, on the occurrence of a measurement involving the numeral "9" in the units there can be brought into operation, right at the commencement of the feeling operation, a special arrangement which effects a relieving of the load on the scale, and brings the latter out of the critical range between two numerical values in the tens. The advancing of the transparent area corresponding to the numeral "9" is necessary since the traversing of the contacts 16 by the photoelectric cell is intended to take place practically simultaneously in the different digit denominations. The above-mentioned lost motion between the frame 22 and the frame 22' serves to provide an interval of sufficient length, on the responding of the numeral "9" in the units, for the actuation of the above-mentioned special arrangement.

Figure 11:
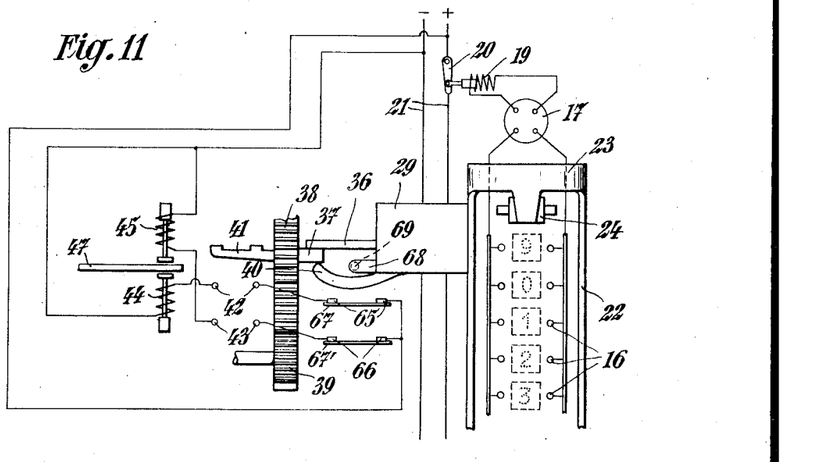

This arrangement is shown in Fig. 11 and is as follows:—The rack 38 is provided with a contact yoke 41 which, on being displaced, is capable of coacting with two pairs of contacts 42, 43 of which the pair 42 is associated with the numeral "9" and the pair 43 with the numeral "0". When the yoke 41 is in the operative position the pairs of contacts 42, 43 are connected into the circuit 21 on the one hand through solenoids 44 and 45, respectively, and on the other hand directly. Between the solenoids and one conductor of the circuit 21 there is provided a device 46 which causes the action of the solenoids 44, 45 to take effect only when the yoke 41 is stationary on the pairs of contacts 42, 43, but not when the yoke merely brushes over the latter. This arrangement will be more clearly described with reference to Figs. 6 and 10. On excitation of the solenoids 44, 45 their cores act, by means of pins passing through the coils, upon different sides of a part 47, for example the platform of the weighing machine, in such a manner that, on excitation of the solenoid 45 an additional loading and on excitation of the solenoid 44 a relieving of the weighing machine is effected. Thus, when the numeral "9" responds, the revolving screen 12 is turned back slightly in consequence of the relieving of the load on the weighing machine, whereas as soon as the numeral "0" responds, the screen is turned forward slightly so that in the marginal region between two numerical values in the tens either the lower or the higher numerical value is caused to respond with certainty. This additional rotation of the revolving screen can not give rise to any disturbance through involving adjoining transparent areas in the units for the reason that after the numeral "9" or "0" has once responded, the rack 38 has already come to a standstill in consequence of the detachment of the armature 33.

If the measuring position should chance to be such that the areas for two adjacent numerals on the ground glass plate are both illuminated to the extent of precisely one half (see "9" and "0" in Fig. 5) it would be conceivable that neither "9" nor "0" might be illuminated sufficiently to influence the cell. In order to ensure reliable indication under such circumstances also, the transparent portion of the revolving screen appropriate to the numeral "0" is made wider than that for the advanced numeral "9". In the abovementioned critical position therefore, the numeral "0" will be registered with certainty, provided the numeral "9" has not been registered already. If desired, this expedient can also be adopted for all the other numerals in the units. The widening of the transparent or nontransparent areas can be effected in the other direction or in both directions.

Figure 6:
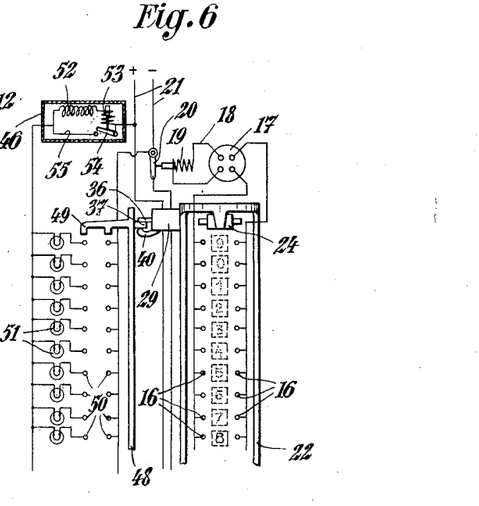
Figs. 6 and 8 show further forms of construction of the means for the transmission of the measurement figures.

The arrangement shown in Fig. 6 for transmitting the figures of measurement to a remote indicator differs from that shown in Fig. 3 by the fact that in place of the rack 38 there is provided a rail 48 adapted to slide in a guide which is not shown in the drawings. This rail 48 is provided with a contact yoke 49 adapted to slide over a series of pairs of contacts 50 which are spaced the same distance apart as the pairs of contacts 16. When the yoke is in the operative position the pairs of contacts 50 form a bridge across the circuit 21 with the inter-position of lamps 51 and of a device 46 the purpose of which has already been outlined in connection with Fig. 3. This device consists of a resistance 52 and a time relay 53 the switch 54 of which is interposed in a bridging conductor 55. The resistance 52 is so dimensioned that the lamps 51 do not light up when the pairs of contacts 50 are merely brushed by the yoke 49 since, under these conditions, the time relay 53 is not capable of closing the switch 54. When the photoelectric cell reaches a position over the illuminated area of the slot the rail 48 is brought to a standstill, and the switch 54 is closed for as long as the time relay is operative, the current being thereby diverted through the conductor 55 and causing the appropriate lamp to light up. These lamps are to be considered as forming parts of a remote indicator having a ground glass plate provided with numerals with which lamps are individually associated. Instead of the lamps here shown, relays or other instrumentalities forming parts of a remote registering, indicating or counting apparatus may be actuated in like manner.

The arrangement 46 for preventing the lighting up of the lamps of the indicator or the influencing of the measuring appliance when an auxiliary loading and relieving device is employed, can if desired be replaced by an arrangement as shown in Fig. 11 of the drawings.

In addition to the contacts 42, 43 there are provided in the circuit of the solenoids 44, 45 contacts 65, 66 which are adapted to be bridged, respectively, by spring bridges 67, 67'. The casing 29 of the magnet carries a rigid arm 68 which, by means of an extension 69 provided with a cam surface, lifts the bridges 67, 67' from the contacts 65, 66 as the casing passes the latter, with the result that a temporary interruption of the circuit of the relays 44, 45 is brought about. When the yoke 41, as the photoelectric cell passes the position for the digit "9" or "0", comes to a standstill upon the contacts 42 or 43, the circuit will be closed by the bridges 67, 67' coming into contact again after the passage of the extension 69, with the result that one or other of the solenoids 44, 45 is excited and the measuring appliance correspondingly relieved or loaded.

In order to prevent the lighting up of the lamps when a remote indicator as shown in Fig. 6 is used, there are provided in addition to the contacts 50, contacts 66 which are bridged by bridges 67, 67', having an action similar to that just described for the solenoids 44, 45.

Figure 7:
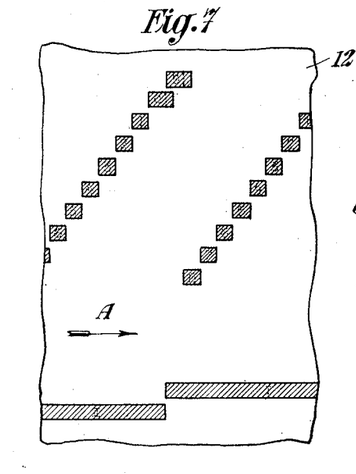
Figure 8:
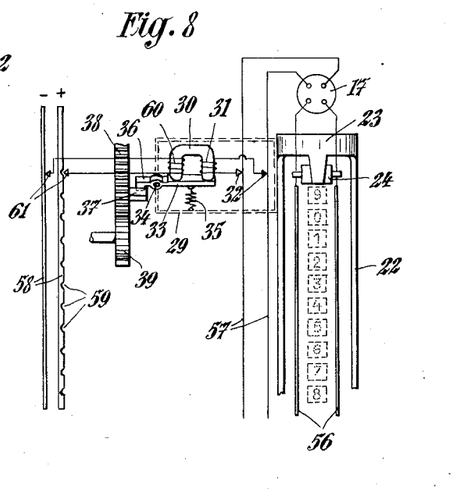

Instead of with transparent areas, the revolving screen 12 can also be provided with non-transparent areas of which the shadow image, falling on the ground glass plate at the slot, weakens a current normally flowing steadily in the photoelectric cell. This arrangement of the revolving screen is indicated in Fig. 7. In this case the transmitting device (Figs. 3 to 6) must be modified as indicated in Fig. 8. This modification consists in the fact that in place of the contacts 16 there are provided two contact rails 56 which are bridged by the photoelectric cell sliding thereon. The amplifier circuit comprises two contact rails 57 on which the contacts 32 slide. Parallel to the rails 56 there are arranged two further rails 58 pertaining to another circuit, which rails are constantly current-conducting and of which the one is provided with interruptions 59 corresponding to the spacing of the shadow images on the ground glass screen. Upon these rails 58 there are arranged to slide two shoes 61 connected to the ends of a winding 60 provided on the electromagnet 30. The interruptions 59 are so arranged that the device controlled by the frame 22 can only be switched off when the photoelectric cell is precisely in the middle of the non-illuminated portion of the ground glass screen, which is necessary for the accurate registration of the measurement figures.

When the photoelectric cell encounters a non-illuminated spot, and the current in the amplifier circuit and in the winding 31 is weakened or interrupted no action is set up for the moment. As soon, however, as the sliding contact 61 reaches one of the interruptions 59, the winding 60 becomes deprived of current, the armature 33 is detached from the magnet by the action of the spring 35, and the transmission of the indication is effected, as above described, by interruption of the registration process.

In the modified form of construction shown in Fig. 9 the portions of the screen (for each digit denomination) adjoining the transparent areas in the feeling direction (arrow C) of the photoelectric cells are made non-transparent. This arrangement provides the advantage that the cells and the amplifier are deprived of current after reaching the non-transparent areas.

The device according to the invention, by using but a single current fluctuation for effecting transmission, is capable of carrying out measuring operations in rapid succession. This rapidity of the single registrations, is also favoured by the fact, that the act of registration is being performed while the feeling device is reaching the measuring position, and after the attainment of the latter merely an interruption requires to be effected. In cases in which no particular value is attached to such rapidity of operation, the procedure could naturally be reversed, by causing the transmitting device to be switched on only after the attainment of the position of measurement, and the differences from zero to be measured with the numerals in the reverse order. The amplifier can also, if desired, be provided on the frame 22, and be allowed to participate in the movement of the latter. Finally, it is also possible to use but one amplifier, provided all the contacts (for all the digit denominations) be so distributed that the photoelectric cells are never influenced simultaneously. If no importance be attached to rapidity of measurement, it is also possible to operate with a single photoelectric cell. The electric remote indicator according to Fig. 6 can also be combined with a recording or counting device according to Fig. 3 or 8. If desired, the photoelectric cells can also be arranged to switch off their drive.

I claim:—

1. In a measuring appliance having a movable member, a movable screen actuated by said member and having a plurality of series of transparent areas, said areas being separated from the remainder of the screen by stepped lines of demarcation, each series of areas being coordinated to one of the digit denominations in the range of measurement of the measuring appliance, the longitudinal extension of each step of the said lines of demarcation corresponding to the value of the unit of measurement of the coordinated digit denomination, each step being coordinated to one digit, in the series coordinated to the lowest digit denomination the steps being divided up into rows, each row corresponding in longitudinal extension to a step of the next higher digit denomination, the highest digit and the lowest digit in each row being represented by two consecutively succeeding steps, and the transition between these two steps being opposite to the transition between two steps of the next higher digit denomination, a ray source behind the screen, a casing, ray responsive means in front of the screen to receive the rays controlled by said areas, further means arranged between the ray responsive means and said ray source, load varying means adapted on the influencing of the ray responsive means in the range of the said highest digit to effect a slight relieving of the appliance and on the influencing of the ray responsive means in the range of the lowest digit a slight additional loading of the appliance for the purpose of ensuring that in the range of the higher digit denomination only the ray effect of one area but not of the transition between two adjacent areas can become operative.

2. In a measuring appliance having a movable member, a movable screen actuated by said member and having defined areas each longitudinally and laterally offset from the preceding area and representing successive measurement values, said areas contrasting in transparency with the remainder of the screen, a ray source behind the screen, a casing having a slot in front of the screen, the said defined areas successively registering with said slot as the screen is moved, an enlarging optical system, a unit responsive to rays from said source, actuating means for moving said ray-responsive unit in a fixed path along the slot, further means between said ray source and said ray responsive unit for limiting the rays emitted from said source and a recording mechanism including parts movable to various settings to determine the record to be made thereby, said ray responsive unit being conjointly influenced on its path by rays from said source, by the areas on said screen and by said other means for controlling recording operations.

3. In a measuring appliance having a movable member, a movable screen actuated by said member and having a coherent transparent and a coherent non-transparent area, said areas being separated by a stepped line of demarcation, the successive steps representing successive measurement values, a ray source behind the screen, a casing having a slot in front of the screen, the steps of said line successively registering with said slot as the screen is moved, an enlarging optical system, a unit responsive to rays from said source, actuating means for moving said ray responsive unit in a fixed path along said slot, further means between said ray source and said ray responsive unit for limiting the rays emitted from said source and a recording mechanism including parts movable to various settings to determine the record to be made thereby, said ray responsive unit being conjointly influenced on its path by rays from said ray source, by the areas on said screen and by said other means for controlling recording operations.

4. In a measuring appliance having a movable member, a movable screen actuated by said member and having a plurality of series of defined areas, each of the series being coordinated to one of the digit denominations in the range of measurement of the measuring appliance, the areas of each series being each longitudinally and laterally offset from the preceding area, the longitudinal extension of the areas of each series corresponding to the value of one unit of the coordinated digit denomination, said areas contrasting in transparency with the remainder of the screen, a ray source behind the screen, a casing having a slot in front of the screen, said areas successively registering with said slot as the screen is moved, an enlarging optical system, a unit responsive to rays from said source, actuating means for moving said ray responsive unit in a fixed path along said slot, further means between said ray source and said ray responsive unit for limiting the rays emitted from said source and a recording mechanism including parts movable to various settings to determine the record to be made thereby, said ray responsive unit being conjointly influenced on its path by rays from said ray source, by the areas on said screen and by said other means for controlling recording operations.

5. In a measuring appliance having a movable member, a movable screen actuated by said member and having a plurality of series of coherent transparent and coherent non-transparent areas, each transparent area being separated from the adjacent non-transparent area by a stepped line of demarcation, each transparent and the adjacent non-transparent area together being coordinated to one of the digit denominations in the range of measurement of the measuring appliance, the longitudinal extension of each step of the said lines of demarcation corresponding to the value of the unit of the coordinated digit denomination, a ray source behind the screen, a casing having a slot in front of the screen, the steps of said lines successively registering with said slot as the screen is moved, an enlarging optical system, a unit responsive to rays from said source, actuating means for moving said ray responsive unit in a fixed path along said slot, further means between said ray source and said ray responsive unit for limiting the rays emitted from said source and a recording mechanism including parts movable to various settings to determine the record to be made thereby, said ray responsive unit being conjointly influenced on its path by rays from said ray source, by the areas on said screen and by said other means for controlling recording operations.

6. In a measuring appliance having a movable member, a movable screen actuated by said member and having a plurality of series of defined areas, each of the series being coordinated to one of the digit denominations in the range of measurement of the measuring appliance, the areas of each series being each longitudinally and laterally offset from the preceding area, the longitudinal extension of the areas of each series corresponding to the value of one unit of the coordinated digit denomination, said areas contrasting in transparency with the remainder of the screen, a ray source behind the screen, a casing having a slot in front of the screen, said areas successively registering with said slot as the screen is moved, an enlarging optical system, a unit responsive to rays from said ray source, for each series of areas, actuating means for moving said ray responsive units in a fixed path, further means between said ray source and said ray responsive units for limiting the rays emitted from said source and a recording mechanism including parts movable to various settings to determine the record to be made thereby, said ray responsive units being conjointly influenced on their path by rays from said ray source, by the areas on said screen and by said other means for controlling recording operations.

7. In a measuring appliance having a movable member, a movable screen actuated by said member and having a plurality of series of coherent transparent and coherent non-transparent areas, each transparent area being separated from the adjacent non-transparent area by a stepped line of demarcation, each transparent and the adjacent non-trasparent area together being coordinated to one of the digit denominations in the range of measurement of the measuring appliance, the longitudinal extension of each step of the said lines of demarcation corresponding to the value of one unit of the coordinated digit denomination, a ray source behind the screen, a casing having a slot in front of the screen, the steps of said lines successively registering with said slot as the screen is moved, an enlarging optical system, associated with each series of areas, a unit responsive to the rays from said source, actuating means for moving said ray responsive units in a fixed path along the slot, further means between said ray source and said ray responsive units for limiting the rays from said ray source and a recording mechanism including parts movable to various settings to determine the record to be made thereby, said ray responsive units being conjointly influenced on their path by rays from said ray source, by the areas on said screen and by said other means for controlling recording operations.

8. In a measuring appliance having a movable member, a movable screen actuated by said member and having defined transparent and non-transparent areas, a ray source behind the screen, a casing having a slot in front of the screen, said slot limiting the rays from said ray source, a unit responsive to rays from said source, actuating means for moving said unit in a fixed path along said slot, a recording mechanism, an operative connection adapted for connection and disconnection between said unit and recording mechanism and arranged to vary the setting of the recording mechanism according to the record to be made thereby, and means to effect disconnection of said operative connection upon the electrical condition of said unit having been varied on its path by passing the place subject to the ray effect.

9. In a measuring appliance having a movable member, a movable screen actuated by said member and having defined transparent and non-transparent areas, a ray source behind the screen, a casing having a slot in front of said screen, said slot limiting the rays from said ray source, a unit responsive to rays from said source, actuating means for moving said unit in a fixed path along said slot, a recording mechanism, an operative connection adapted for connection and disconnection between said unit and recording mechanism and arranged to vary the setting of the recording mechanism according to the record to be made thereby and means to effect connection of said operative connection upon the electrical condition of said unit having been varied on its path by passing the place subject to the ray effect.

10. In a measuring appliance having a movable member, a movable screen actuated by said member and having defined transparent and non-transparent areas, a ray source behind the screen, a casing having a slot in front of said screen, said slot limiting the rays from said source, a unit responsive to rays from said source, actuating means for moving said unit in a fixed path along the slot, recording mechanism, spaced pairs of contacts corresponding in number to the number of the different digits to be recorded, the lateral spacing of said contacts corresponding to the lateral spacing of the steps in the images of the areas projected towards said slot, a circuit, the contacts being connected in multiple to said circuit, contact means carried by said unit for successively bridging the contacts, thereby alternatively closing and opening said circuit, said unit varying as to its electrical condition in accordance with the intensity of action of rays from said ray source impinging thereon and causing thereby variations in said circuit, and means controlled by variations in said circuit and adapted to control the action of the recording mechanism.

11. In a measuring appliance having a movable member, a movable screen actuated by said member and having defined transparent areas and non-transparent areas, a ray source behind the screen, a casing having a slot in front of said screen, said slot limiting the rays from said ray source, a unit responsive to rays from said source, actuating means for moving said unit in a fixed path along said slot, recording mechanism, spaced pairs of contacts corresponding in number to the number of the different digits to be recorded, the lateral spacing of said contacts corresponding to the lateral spacing of the steps in the images of the areas projected towards said slot, a circuit including a current source and an amplifier, the contacts being connected in multiple to said circuit, contact means carried by said unit for successively bridging the contacts thereby alternatively closing and opening said circuit, said unit varying as to its electrical condition in accordance with the intensity of action of the rays from said ray source impinging thereon, and thereby causing variations in said circuit, and means controlled by variations in said circuit for controlling the action of the recording mechanism.

12. In a measuring appliance having a movable member, a movable screen actuated by said member and having defined transparent and non-transparent areas, a ray source behind the screen, a casing having a slot in front of said screen, said slot limiting the rays from said ray source, a unit responsive to rays from said source, actuating means for moving said unit in a fixed path along said slot, a recording mechanism, spaced pairs of contacts corresponding in number to the number of the different digits which are to be recorded, the lateral spacing of said contacts corresponding to the lateral spacing of the steps in the images of the areas projected towards said slot, a circuit, said contacts being connected in multiple to said circuit, contact means carried by said unit for successively bridging said contacts thereby alternatively closing and opening said circuit, said unit varying as to its electrical condition in accordance with the intensity of action of the rays from said ray source impinging thereon and thereby causing variations in said circuit, and an operative connection between said unit and recording mechanism and including an electromagnet for coupling and uncoupling the unit and recording mechanism, said magnet having its winding electrically connected to said circuit.

13. In a measuring appliance having a movable member, a movable screen actuated by said member and having defined transparent and non-transparent areas, a ray source behind the screen, a casing having a slot in front of the screen, said slot limiting the rays from said ray source, a unit responsive to rays from said ray source, actuating means for moving said unit in a fixed path along said slot, recording mechanism, spaced pairs of contacts corresponding in number to the number of the different digits to be recorded the lateral spacing of said contacts corresponding to the lateral spacing of the steps in the images of the areas projected towards said slot, a circuit, said contacts being connected in multiple to said circuit, contact means carried by said unit for successively bridging said contacts thereby alternatively closing and opening said circuit, said unit varying as to its electrical condition in accordance with the intensity of action of rays from said ray source impinging thereon and thereby causing variations in said circuit and an operative connection between said unit and recording mechanism and including an electromagnet for coupling and uncoupling the unit and recording mechanism, said magnet having a pair of opposed windings one of which is directly connected to a current source and the other of which is connected to said circuit.

14. In a measuring appliance having a movable member, a movable screen actuated by said member and having defined transparent and non-transparent areas, a ray source behind the screen, a casing having a slot in front of the screen, said slot limiting the rays from said ray source, a unit responsive to rays from said source, actuating means for moving said unit in a fixed path along said slot, recording mechanism, spaced pairs of contacts corresponding in number to the number of the different digits to be recorded, the lateral spacing of said contacts corresponding to the lateral spacing of the steps in the images of the areas projected towards said slot, a circuit, said contacts being connected in multiple to said circuit, contact means carried by said unit for successively bridging said contacts thereby alternatively closing and opening said circuit, said unit varying as to its electrical condition in accordance with the intensity of action of rays from said source impinging thereon and thereby causing variations in said circuit, a slidably mounted rack for driving the recording mechanism and having a pin projecting from one side, an electromagnet associated with said unit to move therewith and having a winding connected with said circuit, and an armature for said magnet having an arm held in engagement with the pin during full actuation of said magnet, said magnet having a second winding opposed to the first winding and connected directly to the said source of current.

15. In a measuring appliance having a movable member, a movable screen actuated by said member and having a plurality of defined transparent and non-transparent areas, a ray source behind the screen, a casing having a slot in front of the screen, said slot limiting the rays from said ray source, a recording mechanism including separate recording means for each digit denomination, a unit for each digit denomination responsive to rays from said ray source, actuating means for moving said unit in a fixed path in front of said slot, a circuit for each digit denomination dependent for its electrical conditions on the variations in the electrical condition of said unit, a slidable mounted rack for each digit denomination for driving the respective recording means and having a pin projecting from one side, an operative connection between said unit and said recording means and including an electromagnet for coupling and uncoupling the unit and recording means, said magnet having a pair of opposed windings one of which is directly connected to a current source and the other of which is connected to said circuit, an armature for said magnet having an arm held in engagement with the pin during the full actuation of said magnet, a bridging member corresponding to the lowest digit denomination moved by said armature, a plurality of pairs of contacts in the path of said bridging member, load varying means for the measuring appliance including electromagnetic means each connected in series with one of each of the said pairs of contacts, the circuit of the last named electromagnetic means including a resistance for preventing undesirable oscillation of the measuring appliance and a time relay adapted to short circuit the said resistance upon attainment by the said bridging member of an operative position.

16. In a measuring appliance having a movable member, a movable screen actuated by said member and having a plurality of defined transparent and non-transparent areas, a ray source behind the said screen, a casing having a slot in front of the screen, said slot limiting the rays from said ray source, recording mechanism including separate recording means for each digit denomination, a unit for each digit denomination responsive to rays from said ray source, actuating means for moving said unit in a fixed path in front of said slot, a circuit for each digit denomination dependent for its electrical conditions on the variations in the electrical condition of said unit, a slidably mounted rack for each digit denomination for driving the respective recording means and having a pin projecting from one side thereof, an operative connection between said unit and said recording means and including an electromagnet for coupling and uncoupling the unit and recording means, said magnet having a pair of opposed windings one of which is directly connected to a current source and the other of which is connected to said circuit, an armature for said magnet having an arm held in engagement with the pin during the full actuation of said magnet, a bridging member corresponding with the lowest digit denomination moved by said armature, a plurality of pairs of contacts in the path of said bridging member, load varying means for the measuring appliance including electromagnetic means, each connected in series with one of each of the said pairs of contacts and switches controlling the said load varying means and adapted to open temporarily upon brushing of the said contacts by the said bridging member.

17. In a measuring appliance having a movable member, a movable screen actuated by said member and having a plurality of defined transparent and non-transparent areas, a ray source behind the screen, a casing having a slot in front of the screen, said slot limiting the rays from said ray source, recording mechanism including separate recording means for each digit denomination, a unit responsive to rays from said ray source, actuating means for moving said unit in a fixed path in front of said slot, a circuit for each digit denomination dependent for its electrical conditions on the variations in the electrical condition of said unit, said circuit including a source of current and an amplifier, a pair of contact rails and a plurality of spaced pairs of contacts corresponding to each digit denomination, said contact rails and said spaced pairs of contacts arranged along the path of said unit and connected to said circuit, a slidably mounted rack for each digit denomination for driving the respective recording means and having a pin projecting from one side, an operative connection between said unit and said recording means and including an electromagnet for coupling and uncoupling the unit and recording means, said magnet having a pair of opposed windings one of which is directly connected to a current source and the other of which is connected by means of slidable contacts brushing the said spaced pairs of contacts to said circuit, an armature for said magnet having an arm held in engagement with the pin during the full actuation of said magnet, a bridging member corresponding with the lowest digit denomination moved by said armature, a plurality of pairs of contacts in the path of said bridging member, load varying means for the measuring appliance including electromagnetic means, each connected in series with one of each of the last mentioned pairs of contacts, and switches controlling the load varying means and adapted to temporarily open upon brushing of the last mentioned contacts by the said bridging member.

18. In a measuring appliance having a movable member, a movable screen actuated by said member and having defined transparent and non-transparent areas, a ray source behind the screen, a casing having a slot in front of the screen, said slot limiting the rays from said ray source, a unit responsive to rays from said source, actuating means for moving said unit in a fixed path along said slot, recording mechanism, spaced pairs of contacts corresponding in number to the number of the different digits to be recorded, the lateral spacing of said contacts corresponding to the lateral spacing of the steps in the images of the areas projected towards said slot, a circuit, said contacts being connected in multiple to said circuit, contact means carried by said unit for successively bridging said contacts thereby alternatively closing and opening said circuit, said unit varying as to its electrical condition in accordance with the intensity of action of rays from said ray source impinging thereon and thereby causing variations in said circuit, an electromagnet moving with said unit and having a winding connected to said circuit, an armature for said magnet, a bridging member adapted to be engaged and disengaged by said magnet, a second series of spaced pairs of contacts, translating devices each connected to one contact of a respective pair of the last mentioned contacts, connecting means for connecting the remaining contacts of the last mentioned pairs and the translating devices in multiple to the source of current, said bridging member being adapted to traverse over the last mentioned contact pairs thereby successively closing the circuits of the translating devices, said connecting means including a resistance for preventing undesirable operations of the translating devices and a time relay adapted to short circuit the said resistance upon the attainment by the said bridging member of an operative position, said first mentioned magnet having a second winding opposed to its first winding and directly connected to the current source.

19. In a measuring appliance having a movable member, a movable screen actuated by said member and having a plurality of defined transparent and non-transparent areas, a ray source behind the screen, a casing having a slot in front of said screen, said slot limiting the rays from said source, recording mechanism including separate recording means for each digit denomination, a unit for each digit denomination responsive to rays from said ray source, actuating means for moving said unit in a fixed path in front of said slot, a circuit for each digit denomination dependent for its electrical conditions on the variations in the electrical condition of said unit, an operative connection between each unit and the respective recording means and including an electromagnet having a winding connected to said circuit, an armature for said magnet, a bridging member for each digit denomination adapted to be engaged and disengaged by said magnet, a series of spaced pairs of contacts for each digit denomination, translating devices each connected to one contact of a respective pair of said series, connecting means for connecting the remaining contacts of the said series and the translating devices in multiple to the source of current, said bridging member being adapted to traverse over the contacts of said series thereby successively closing the circuits of the translating devices, said connecting means including switches for controlling the translating devices and adapted to temporarily open upon brushing of the contacts of the said series by the said bridging member, a further bridging member corresponding to the lowest digit denomination and moved by said armature, two pairs of contacts in the path of the last mentioned bridging member, load varying means for the measuring appliance including electromagnetic means each connected in series with one of the two pairs of contacts and switches controlling the load varying means and adapted to open temporarily upon brushing of the two pairs of contacts by the last mentioned bridging member, said first mentioned magnet having a second winding opposed to its first winding and directly connected to the current source.

20. In a measuring appliance having a movable member, a movable screen actuated by said member and having a plurality of defined transparent and non-transparent areas, a ray source behind the screen, a casing having a slot in front of the screen, said slot limiting the rays from said ray source, recording mechanism including separate recording means for each digit denomination, a unit responsive to rays from said ray source, actuating means for moving the unit in a fixed path in front of said slot, a circuit for each digit denomination dependent for its electrical conditions on the variations in the electrical condition of said unit, said circuit including a source of current and an amplifier, a pair of contact rails and a plurality of spaced pairs of contacts corresponding to each digit denomination, said contact rails and said spaced contact pairs being arranged along the path of said unit and connected to said circuit, an operative connection between the unit and the respective recording means and including an electromagnet having a winding connected to said circuit by means of sliding contacts brushing across said spaced pairs of contacts, an armature for said magnet, a bridging member for each digit denomination adapted to be engaged and disengaged by said magnet, a series of spaced pairs of contacts for each digit denomination, translating devices each connected to one of a respective pair of said series, connecting means for connecting the remaining contacts of the said series and the translating devices in multiple to the source of current, said bridging member being adapted to traverse over the contacts of the said series thereby successively closing the circuits of the translating devices, said connecting means including switches for controlling the translating devices and adapted to open temporarily upon brushing of the contacts of said series by the said bridging member, a further bridging member corresponding to the lowest digit denomination moved by said armature, two pairs of contacts in the path of the last mentioned bridging member, load varying means for the measuring appliance including electromagnetic means each connected in series with one of the two pairs of contacts and switches controlling the load varying means and adapted to open temporarily upon brushing of the two contact pairs by the last mentioned bridging member, said first mentioned magnet having a second winding opposed to the first winding and directly connected to the current source.

21. In a measuring appliance having a movable member, a movable screen actuated by said member, and a plurality of defined transparent and non-transparent areas, a ray source behind the screen, a casing having a slot in front of said screen, said slot limiting the rays from said ray source, two rails in part of the said slot, a recording mechanism including separate recording means for each digit denomination, a unit for each digit denomination responsive to rays from said ray source, actuating means for moving said unit in a fixed path along the said two rails, a circuit for each digit denomination connected to said rails and dependent in its electrical conditions on the variations in the electrical condition of said unit, a slidably mounted rack for each digit denomination for driving the respective recording means and having a pin projecting from one side, an operative connection between said unit and said recording means and including an electromagnet for coupling and uncoupling the unit and recording means, an armature for said magnet having an arm held in engagement with the pin during full actuation of said magnet, said magnet having a pair of windings one of which is connected to said circuit and the other of which is connected by a pair of slidable contacts to a second pair of rails one of which is divided into a series of segments, said last pair of rails being directly connected to the source of current, the said slidable contacts having their movement controlled by said magnet.

22. In a measuring appliance having a movable member, a movable screen actuated by said member and having defined areas disposed in stepped formation, the extension of one area in the direction of movement of the screen corresponding to the value of one measurement unit, said areas contrasting in transparency with the remainder of the screen, a ray source behind the screen, means in front of the screen to receive the projection of the said areas produced by passage of the rays from said source through the screen, and further screening means in the path of said rays for selecting from the said projection a part corresponding to the extension of one area.

23. In a measuring appliance having a movable member, a movable screen actuated by said member and having one transparent and one non-transparent area, the line of demarcation between the said areas having stepped formation, the extension of one step of which in the direction of movement of the screen corresponds to the value of one measurement unit, a ray source behind the screen, means in front of the screen to receive the projection of the said areas produced by passage of the rays from said source through the screen, and further screening means in the path of said rays for selecting from the said projection a part corresponding to the extension of one step.

24. In a measuring appliance having a movable member, a movable screen actuated by said member and having a plurality of series of defined areas, each of the said series being coordinated to one of the digit denominations in the range of measurement of said measuring appliance, the areas of each series being disposed in stepped formation, the extension of one area in the direction of movement of the screen corresponding to the value of one unit of the coordinated digit denomination, each area being coordinated to one digit, said areas contrasting in transparency with the remainder of the screen, a ray source behind the screen, means in front of the screen to receive the projection of the said areas produced by passage of the rays from said source through the screen, and further screening means in the path of said rays for selecting from the said projection in each digit denomination a part corresponding to the extension of one area coordinated to the unit of the lowest digit denomination.

25. In a measuring appliance having a movable member, a movable screen actuated by said member and having defined areas disposed in stepped formation, the extension of one area in the direction of movement of the screen corresponding to the value of one measurement unit, said areas contrasting in transparency with the remainder of the screen, a ray source behind the screen, means in front of the screen to receive the projection of the said areas produced by passage of the rays from said source through the screen, and further screening means in the path of said rays for selecting from the said projection a part corresponding to the extension of one area, said areas being widened in at least one direction for ensuring the attainment of ray effect for one of two successive values when the areas are in any intermediate position.

26. In a measuring appliance having a movable member, a movable screen actuated by said member and having a plurality of transparent and non-transparent areas, each transparent and an adjacent non-transparent area together being coordinated to one of the digit denominations in the range of measurement of the measuring appliance, the line of demarcation between the said adjacent areas having stepped formation, the extension of one step of which in the direction of movement of the screen corresponds to the value of one unit of the coordinated digit denomination, each step being coordinated to one digit, a ray source behind the screen, means in front of the screen to receive the projection of the said areas produced by passage of the rays from said source through the screen, and further screening means in the path of said rays for selecting from the said projection in each digit denomination a part corresponding to the extension of one step coordinated to the unit of the lowest digit denomination.

27. In a measuring appliance having a movable member, a movable screen actuated by said member and having a plurality of series of defined areas, each of the said series being coordinated to one of the digit denominations in the range of measurement of the measuring appliance, the areas of each series being disposed in stepped formation, the extension of one area in the direction of movement of the screen corresponding to the value of one unit of the coordinated digit denomination, each area being coordinated to one digit, said areas contrasting in transparency with the remainder of the screen, the steps in the series of areas coordinated to the lowest digit denomination being arranged in staggered sections, the extension of each section in the direction of movement of the screen being equal to that of an area in the next higher digit denomination, the highest digit and the lowest digit being represented by two consecutively succeeding areas in each section, the transition between these two areas being opposite to the transition between two areas of the next higher digit denomination, a ray source behind the screen, ray responsive means in front of the screen to receive the projection of the said areas produced by passage of the rays from said source through the screen, and further screening means in the path of said rays for selecting from the said projection in each digit denomination a part corresponding to the extension of one area coordinated to the unit of the lowest digit denomination, load varying means adapted upon influencing of the ray responsive means in the range of the said highest digit to effect a slight relieving of the loading of the appliance and to effect upon influencing of the ray responsive means in the range of the lowest digit a slight additional loading of the appliance for the purpose of ensuring that in the range of the higher digit denomination only the ray effect of one area but not of the transition between two adjacent areas can become operative.

28. In a measuring appliance having a movable member, a movable screen actuated by said member and having a plurality of series of defined areas, the areas embodying the partitions of the scale of the appliance, each of the said series being coordinated to one of the digit denominations in the range of measurement of the measuring appliance, said areas contrasting in transparency with the remainder of the screen, a ray source behind the screen, ray responsive means in front of the screen to receive the projection of the said areas produced by way of the rays going through the screen, further screening means for selecting from the said projection in each digit denomination a part corresponding to the unit of the lowest digit denomination, and load varying means adapted on the influencing of the ray responsive means to effect a slight relieving or a slight additional loading of the appliance.

29. In a measuring appliance having a movable member, a movable screen actuated by said member and having a plurality of transparent and non-transparent areas, each transparent and an adjacent non-transparent area together being coordinated to one of the digit denominations in the range of measurement of the measuring appliance, the line of demarcation between the said adjacent areas having stepped formation, the extension of one step of which in the direction of movement of the screen corresponds to the value of one unit of the coordinated digit denomination, each step being coordinated to one digit, the steps coordinated to the lowest digit denomination being arranged in staggered sections, the extension of each section in the direction of movement of the screen being equal to that of a step in the next higher digit denomination, the highest digit and the lowest digit being represented by two consecutively succeeding steps in each section, the transition between these two steps being opposite to the transition between two steps of the next higher digit denomination, a ray source behind the screen, ray responsive means in front of the screen to receive the projection of the said areas produced by passage of the rays from said source through the screen, and further screening means in the path of said rays for selecting from the said projection in each digit denomination a part corresponding to the extension of one step coordinated to the unit of the lowest digit denomination, load varying means adapted on the influencing of the ray responsive means in the range of the said highest digit to effect a slight relieving of the loading of the appliance and to effect on the influencing of the ray responsive means in the range of the lowest digit a slight additional loading of the appliance for the purpose of ensuring that in the range of the higher digit denomination only the ray effect of one step, but not of the transition between two adjacent steps can become operative.

30. In a measuring appliance having a movable member, a movable screen actuated by said member and having defined areas disposed in stepped formation, the extension of one area in the direction of movement of the screen corresponding to the value of one measurement unit, said areas contrasting in transparency with the remainder of the screen, a ray source behind the screen, means in front of the screen to receive the projection of the said areas produced by passage of the rays from said source through the screen, further screening means in the path of said rays for selecting from the said projection a part corresponding to the extension of one area, and an optical system in the path of said rays and between said movable screen and said receiving means to produce enlarged images of the areas on the said receiving means.

31. In a measuring appliance having a movable member, a movable screen actuated by said member and having defined areas disposed in stepped formation, the extension of one area in the direction of movement of the screen corresponding to the value of one measurement unit, said areas contrasting in transparency with the remainder of the screen, a ray source behind the screen, a casing in front of the screen having a slot, means in front of the slot to receive the projection of the said areas produced by passage of the rays from said source through the screen, the dimensions of said slot being arranged to select from the said projection a part corresponding to the extension of one area.

32. In a measuring appliance having a movable member, a movable screen actuated by said member and having defined window areas disposed in stepped formation, the extension of one window area in the direction of movement of the screen corresponding to the value of one measurement unit, a light source behind the screen, a casing having a slot in front of the screen, means in front of the slot to receive the projection of the said window areas produced by passage of the light rays from said source through the screen, the dimensions of said slot being arranged to select from the said projection a part corresponding to the extension of one area.

33. In a measuring appliance having a movable member, a movable screen actuated by said member and having defined window areas disposed in stepped formation, the extension of one window area in the direction of movement of the screen corresponding to the value of one measurement unit, a light source behind the screen, a casing having a slot in front of the screen, an enlarging optical system between the screen and slot, means extending over said slot to receive the projection of the said window areas produced by passage of the light rays from said source through the screen, and further screening means in the path of said rays for selecting from the said projection a part corresponding to the extension of one window area, said receiving means comprising a translucent screen having a series of figures thereon spaced laterally to be selectively illuminated by light from successive window areas.

34. In a measuring appliance having a movable member, a movable screen actuated by said member and having one transparent and one non-transparent area, the line of demarcation between the said areas having stepped formation, the extension of one step of which in the direction of movement of the screen corresponds to the value of one measurement unit, a light source behind the screen, a casing having a slot in front of the screen, an enlarging optical system between the screen and slot, means extending across said slot to receive the projection of said areas produced by passage of the light rays from said source through the screen, and further screening means in the path of said rays for selecting from said projection a part corresponding to the extension of one step, said receiving means comprising a translucent screen having a series of figures thereon spaced laterally so as to be selectively illuminated by light from said transparent area.

35. In a measuring appliance having a movable member, a movable screen actuated by said member and having a plurality of series of defined window areas, each of the said series being coordinated to one of the digit denominations in the range of measurement of said measuring appliance, the window areas of each series being disposed in stepped formation, the extension of one window area in the direction of movement of the screen corresponding to the value of one unit of the coordinated digit denomination, each window area being coordinated to one digit, a light source behind the screen, a casing having a slot in front of the screen, an enlarging optical system between the screen and slot, means extending across said slot to receive the projection of said window areas produced by passage of the light rays from said source through the screen, and further screening means in the path of said rays for selecting from said projection in each digit denomination a part corresponding to the extension of one window area coordinated to the unit of the lowest digit denomination, said receiving means comprising a translucent screen having a series of figures thereon for each series of window areas, said figures being spaced laterally to be selectively illuminated by light from successive window areas of each series.

36. In a measuring appliance having a movable member, a movable screen actuated by said member and having a plurality of transparent and non-transparent areas, each transparent and an adjacent non-transparent area together being coordinated to one of the digit denominations in the range of measurement of the measuring appliance, the line of demarcation between the said adjacent areas having stepped formation, the extension of one step of which in the direction of movement of the screen corresponds to the value of one unit of the coordinated digit denomination, each step being coordinated to one digit, a light source behind the screen, a casing having a slot in front of the screen, an enlarging optical system between the screen and slot, means extending across said slot to receive the projection of the said areas produced by passage of the light rays from said source through the screen, and further screening means in the path of said rays for selecting from the said projection in each digit denomination a part corresponding to the extension of one step coordinated to the unit of the lowest digit denomination, said receiving means comprising a translucent screen having a series of figures for each transparent and non-transparent area and spaced laterally to be selectively illuminated by light from said transparent areas.

37. In a measuring appliance having a movable member, a movable screen actuated by said member and having a plurality of defined areas, said areas contrasting in transparency with the remainder of the screen, a ray source behind the screen, an enlarging optical system, a unit responsive to rays from said source in front of the screen to receive the projection of the said areas produced by way of the rays going through the screen, further screening means for selecting from the said projection a part corresponding to the lowest measurement unit in the range of measurement of the appliance, actuating means for moving said ray responsive unit transversally to the direction of the movement of the screen on a path the length of which corresponds to the extension of the enlarged projection of the said area and a recording mechanism, said ray responsive unit being conjointly influenced on its path by rays from said source passing through the areas on said screen and the further screening means for controlling recording operations.

MAXIMILIAN BÄUML.